United States Patent
Yamada et al.

(10) Patent No.: US 6,777,912 B1
(45) Date of Patent: Aug. 17, 2004

(54) POWER SOURCE SYSTEM FOR DRIVING VEHICLE

(75) Inventors: Jun Yamada, Ageo (JP); Yoshiaki Yamada, Ageo (JP); Tsutomu Sasaki, Ageo (JP); Masakazu Sasaki, Ageo (JP)

(73) Assignee: Nissan Diesel Motor Co, Ltd., Saitama (JP)

( * ) Notice: Subject to any disclaimer, the term of this patent is extended or adjusted under 35 U.S.C. 154(b) by 0 days.

(21) Appl. No.: 10/048,589

(22) PCT Filed: Mar. 30, 2000

(86) PCT No.: PCT/JP00/02027

§ 371 (c)(1),
(2), (4) Date: May 3, 2002

(87) PCT Pub. No.: WO01/08921

PCT Pub. Date: Feb. 8, 2001

(30) Foreign Application Priority Data

Aug. 2, 1999 (JP) .......................................... 11-218580

(51) Int. Cl.$^7$ .............................................. H01M 10/46
(52) U.S. Cl. ...................................... 320/118; 320/166
(58) Field of Search ................................ 320/116, 118, 320/127, 135, 166

(56) References Cited

U.S. PATENT DOCUMENTS 5,710,504 A    1/1998  Pascual et al.

FOREIGN PATENT DOCUMENTS

| JP | 05-030608 | 2/1993 |
|---|---|---|
| JP | 08-168182 | 6/1996 |
| JP | 09-233608 | 9/1997 |
| JP | 09-271102 | 10/1997 |
| JP | 09-318679 | 12/1997 |
| JP | 10-094169 | 4/1998 |
| JP | 10-094182 | 4/1998 |

*Primary Examiner*—Edward H. Tso
(74) *Attorney, Agent, or Firm*—Rabin & Berdo, P.C.

(57) ABSTRACT

This invention allows storage electric power to be secured at a maximum by reducing variation in potential between a plurality of capacitors constituting an electric power storage device as follows. A plurality of capacitor banks are provided, in parallel, in the electric power storage device. A part of the respective capacitor banks is halted depending on the current flowing through the electric power storage device. Electric charge of the respective capacitor parallel circuits is individually discharged in the halted capacitor bank, thereby, the terminal voltage of the respective capacitor parallel circuits are equalized.

8 Claims, 7 Drawing Sheets

21 CAPACITOR
22 CAPACITOR SERIES CIRCUIT
23 CAPACITOR PARALLEL CIRCUIT ary machine. The electric power storage device 4 is a system in which a plurality of capacitors, 41, 42, 43, . . . are connected in series, and the conventional chemical secondary battery is replaced with these capacitors. When the vehicle is accelerated or is running at constant speed, a part or all of the power generated by the generator 2 is charged in the electric power storage device 4, and the power generated by the generator 2 and the power in the electric power storage device 4 are supplied to the motor 6 through the inverter 5. When braking the vehicle, the power generated in the motor 6 is regenerated to the electric power storage device 4 through the inverter 5.

POWER SOURCE SYSTEM FOR DRIVING VEHICLE

FIELD OF THE INVENTION

This invention relates to a power supply system for driving a vehicle using a plurality of capacitors in an electric power storage device.

BACKGROUND OF THE INVENTION

An electric power storage device, as a power source, mounted on a vehicle equipped with an electric motor, discharges when the vehicle accelerates or runs at constant speed, and charges when the vehicle is braked. One known type of such an electric power storage device uses a plurality of capacitors, for example, electric double layer capacitor cells. Japanese Laid-Open Patent No. Hei-8-168182 published in 1996 discloses a power supply system using capacitors.

FIG. 7 shows a schematic diagram of a prior art of a power supply system using a capacitor electric power storage device mounted on a series type hybrid vehicle. An engine 1 drives a generator 2. Power generated by the generator 2 is supplied to an electric power storage device 4 through a rectifier 3, and simultaneously supplied to a motor 6 through an inverter 5. Wheels, not shown, are driven by the motor 6. In the drawing, 8 is an auxiliary electric power storage device comprised of chemical batteries, and 7 is a DC-DC converter charging the auxiliary electric power storage device 8, and 9 is auxiliary machine. The electric Furthermore, because there are variations in electrostatic capacity among respective capacitors 41, 42, 43 . . . , some capacitors, 41, 42, 43, . . . may be overcharged, overdischarged or inversely charged when the electric power storage device 4 is repeatedly charged and discharged. This causes a problem in that the capacitors are deteriorated. If, so as to avoid this problem, a range of the terminal voltage of the capacitors 41, 42, 43 . . . is limited, electrostatic energy proportional to the square of the terminal voltage is remarkably reduced.

SUMMARY OF THE INVENTION

This invention provides a power supply system for a vehicle, the power supply system comprising: an electric power storage device including a parallel connection of a plurality of capacitor banks, each of the capacitor banks having a plurality of capacitors connected in series; a bank halting means for halting at least one of the plurality of capacitor banks depending on the current flowing through the electric power storage device; individual discharging circuits each individually discharging the electric charge of the respective capacitors; and a discharging control means for equalizing the terminal voltage of the capacitors in the halted capacitor bank by individually discharging the electric charge of the respective capacitors.

Even if there are some variations in electrostatic capacity among respective capacitors, this invention allows storage electric power to be secured at a maximum by reducing variations in electric potential among respective capacitors. Further, even when the electric power storage device is repeatedly charged and discharged, this invention allows variations in electric potential among respective capacitors to be reduced in a driving state in which at least one of the capacitor banks can be halted. This prevents a part of the respective capacitors from being overcharged and overdischarged, or inversely charged. Thus, efficiency in the electric power storage device can be enhanced, and a long-life power supply system for a vehicle can be realized.

In this invention, the capacitor bank may comprise: a capacitor series circuit having a plurality of capacitors connected in series, and being connected to the power circuit in parallel; and a capacitor parallel circuit in which the capacitors arranged in the same series stage of the capacitor series circuit are connected in parallel. The individual discharging circuit can equalize the respective terminal voltages by individually discharging the electric charge in the respective capacitor parallel circuits.

Thus, even if there are some variations in electrostatic capacity among the respective capacitor parallel circuits, this invention allows the storage electric power to be secured at a maximum by reducing variations in electric potential among the respective capacitor parallel circuits.

Further, since this invention provides an individual voltage detecting circuit for detecting the terminal voltage of the respective capacitor parallel circuits, the bank halting means can be constituted so as to halt the capacitor bank with a large variation in the detected terminal voltage of the capacitor parallel circuits. Thus, the terminal voltage of respective capacitor parallel circuits is detected, and then variations in electric potential among the respective capacitors can be efficiently reduced by halting the capacitor bank which has a large variation in the detected terminal voltage of the capacitor parallel circuits.

Since this invention provides an individual voltage detecting circuit for detecting the terminal voltage of the respective capacitor parallel circuits, the discharging control means can be arranged so as to allow the respective capacitors to discharge to the average terminal voltage of the capacitor parallel circuits. The variations in electric potential among the respective capacitors can be efficiently reduced by detecting the terminal voltage of the respective capacitor parallel circuits and allowing the respective capacitors to discharge to the average terminal voltage of the capacitor parallel circuits.

Since this invention provides a discharging state detecting means for detecting a discharging state of the capacitor discharged by the individual discharging circuit, variations in electric potential among the respective capacitors can be efficiently reduced by detecting the discharging state of the capacitor discharged by the individual discharging circuit.

DESCRIPTION OF THE PREFERRED EMBODIMENTS

Figure 1:
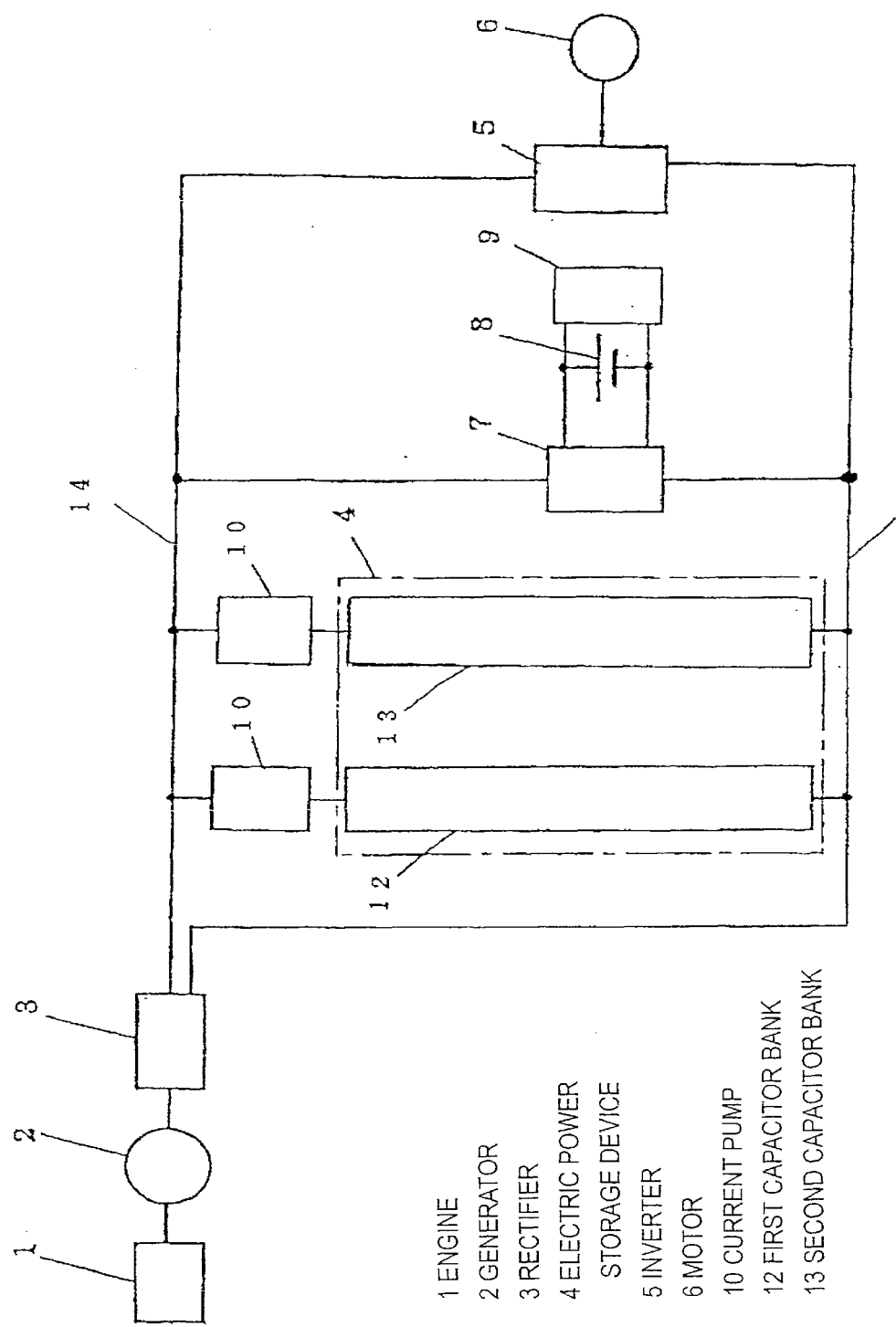
FIG. 1 is a conceptual diagram of an embodiment of the power supply system for an electric vehicle according to the invention.

FIG. 1 shows an embodiment of a power supply system in which this invention is applied to an electric power storage device mounted on a series type hybrid vehicle. Referring to FIG. 1, an engine 1 drives a generator 2. Power generated by the generator 2 is supplied to an electric power storage device 4 from a rectifier 3 through power circuits 14 and 15, and simultaneously supplied to a motor 6 through an inverter 5. A current pump 10 consisting of a two-way raising and lowering voltage chopper circuit is provided between the electric power storage device 4 and the inverter 5. The current pump 10 controls the output voltage to the inverter 5 at a constant when the motor 6 is driven, and further controls the charging current to the electric power storage device 4 to a proper value when the motor 6 regeneratively generates power or the generator 2 generates power. Wheels, not shown, are driven by the motor 6. In FIG. 1, the numeral reference 8 shows an auxiliary electric power storage device comprising chemical batteries, and the numeral reference 7 shows a DC—DC converter for charging the auxiliary electric power storage device 8, and the numeral reference 9 shows an auxiliary machine.

Figure 2:
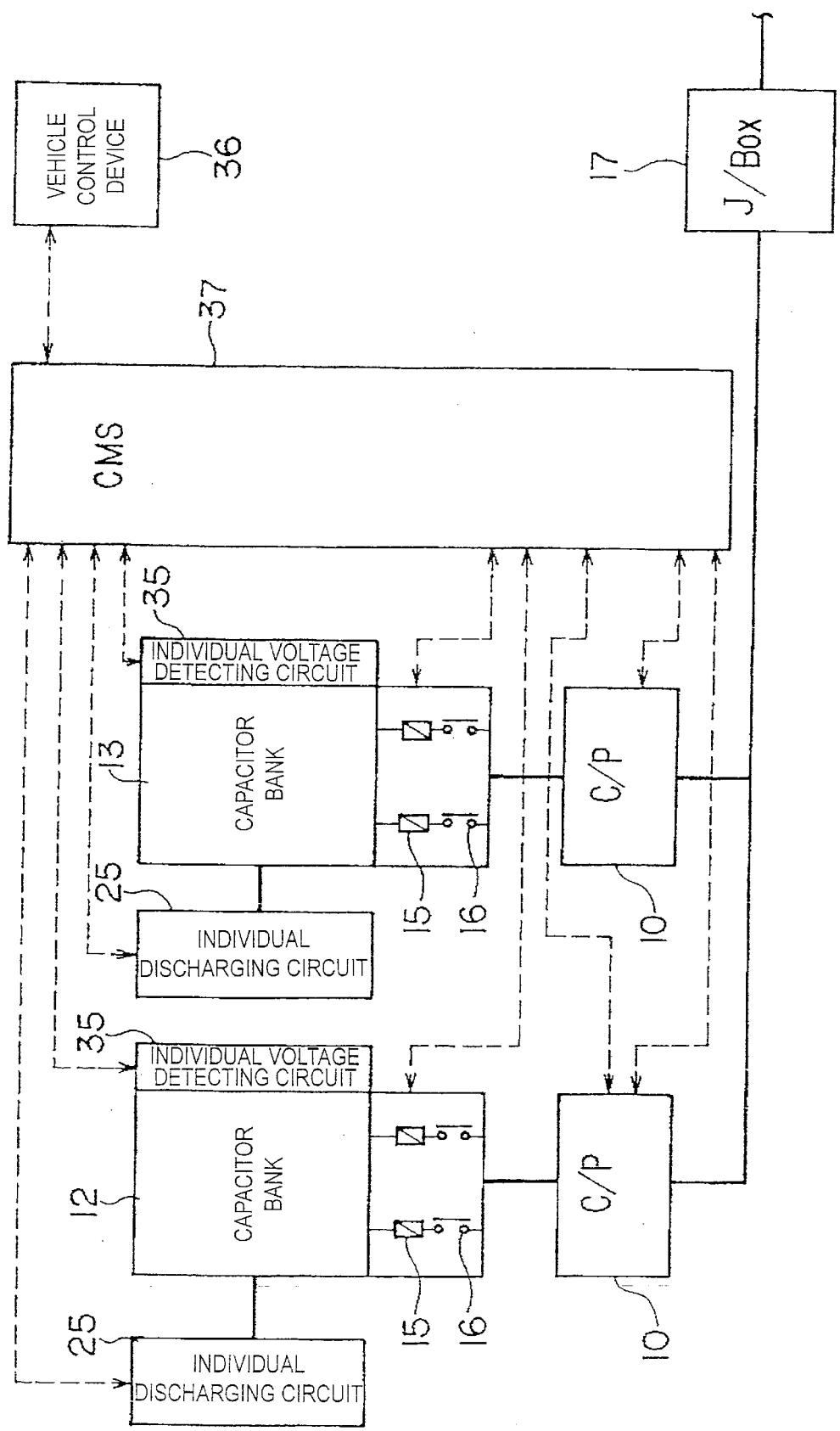
FIG. 2 is a configuration diagram of the electric power storage device for the power supply system.

A vehicle control device 36 shown in FIG. 2 is equipped with a microcomputer and its peripheral parts. The vehicle control device 36 controls the operation of the engine 1 depending on the driving conditions of the vehicle, and further controls generating power via the rectifier 3. And further, the vehicle control device 36 controls revolution and output torque of the motor 6, or regenerated power, via the inverter 5.

In the above, the basic constitution of the hybrid vehicle to which this invention is applicable is exemplified. It is an objective of this invention to reduce variations in electric potential between respective capacitors 21 constituting the electric power storage device 4 in such a hybrid vehicle, and secure storage electric power of the electric power storage device 4 at a maximum.

In this invention, the electric power storage device 4 comprises a first capacitor bank 12 and a second capacitor bank 13 which respectively consist of approximately 1000 capacitors 21. It is necessary that at least two capacitor banks be provided. The respective current pumps 10 are provided between the first capacitor bank 12 and the power circuit 14 and between the second capacitor bank 13 and the power circuit 14 through fuses 45 and contactors 16. The power circuit 14 is connected to the rectifier 3 and the inverter 5 through a junction box 17.

Figure 3:
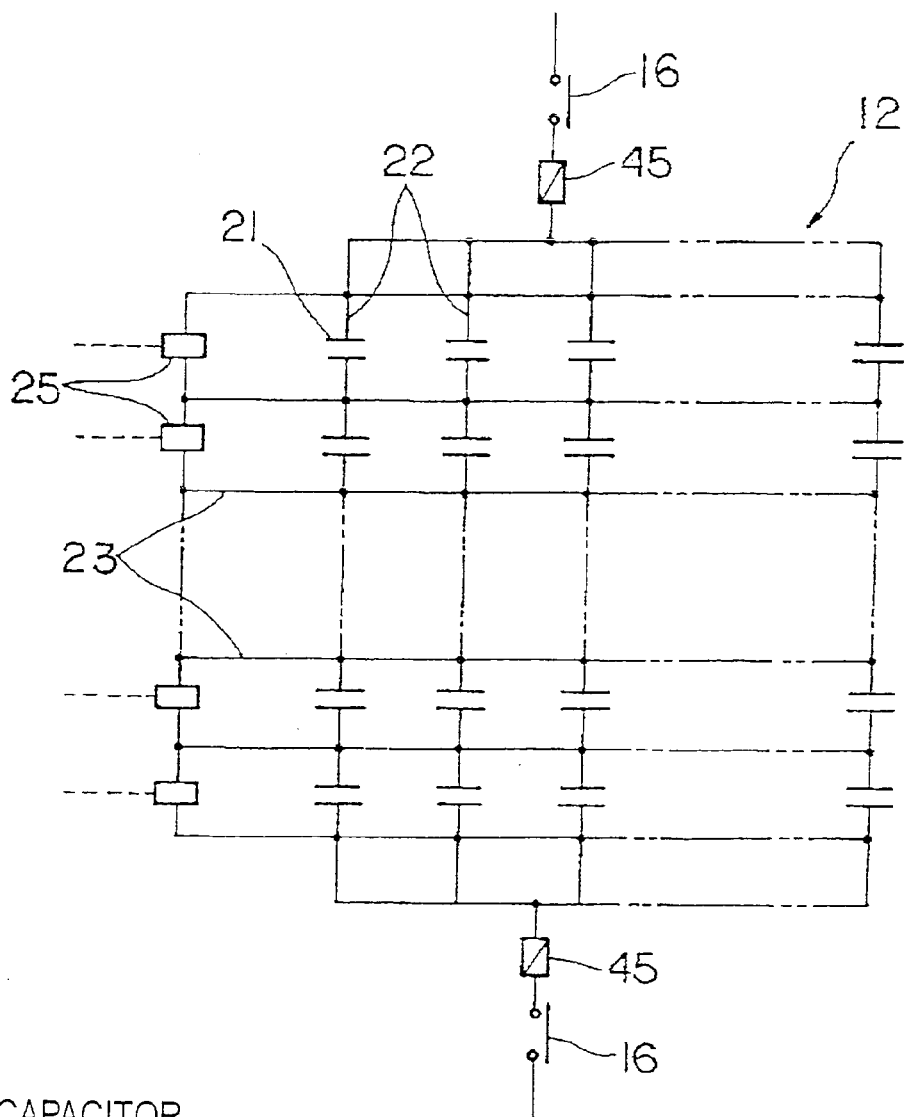
FIG. 3 is a circuit diagram of the first capacitor bank in the electric power storage device for the power supply system.

As shown in FIG. 3, the first capacitor bank 12 comprises n pieces of capacitor series circuits 22 provided in parallel between the power circuits 14 and 15, and respective m pieces of capacitors 21 are provided in series therebetween in the respective capacitor series circuits 22. Therefore, the first capacitor bank 12 consists of a total of m×n pieces of capacitors 21. Furthermore, the second capacitor bank 13 is also constituted in the same manner as the first capacitor bank 12.

A capacitor management system 37 comprises a microcomputer and its peripheral parts, exchanges information with a vehicle control device 36, and further controls charging and discharging of the first and second capacitor banks 12 and 13 through respective current pumps 10. Further, the capacitor management system 37 may be integrated with the vehicle control device 36.

M pieces of capacitor parallel circuits 23 are provided in which n pieces of capacitors 21 arranged on the same series stage of the respective series circuits 22 are provided in parallel therebetween. There provided is an individual voltage detecting circuit 35 for detecting voltage between terminals of respective capacitor parallel circuits 23. And further, there provided are individual discharging circuits 25 for discharging electric charge in the respective capacitor parallel circuits 23, and regulating their terminal voltages.

Figure 4:
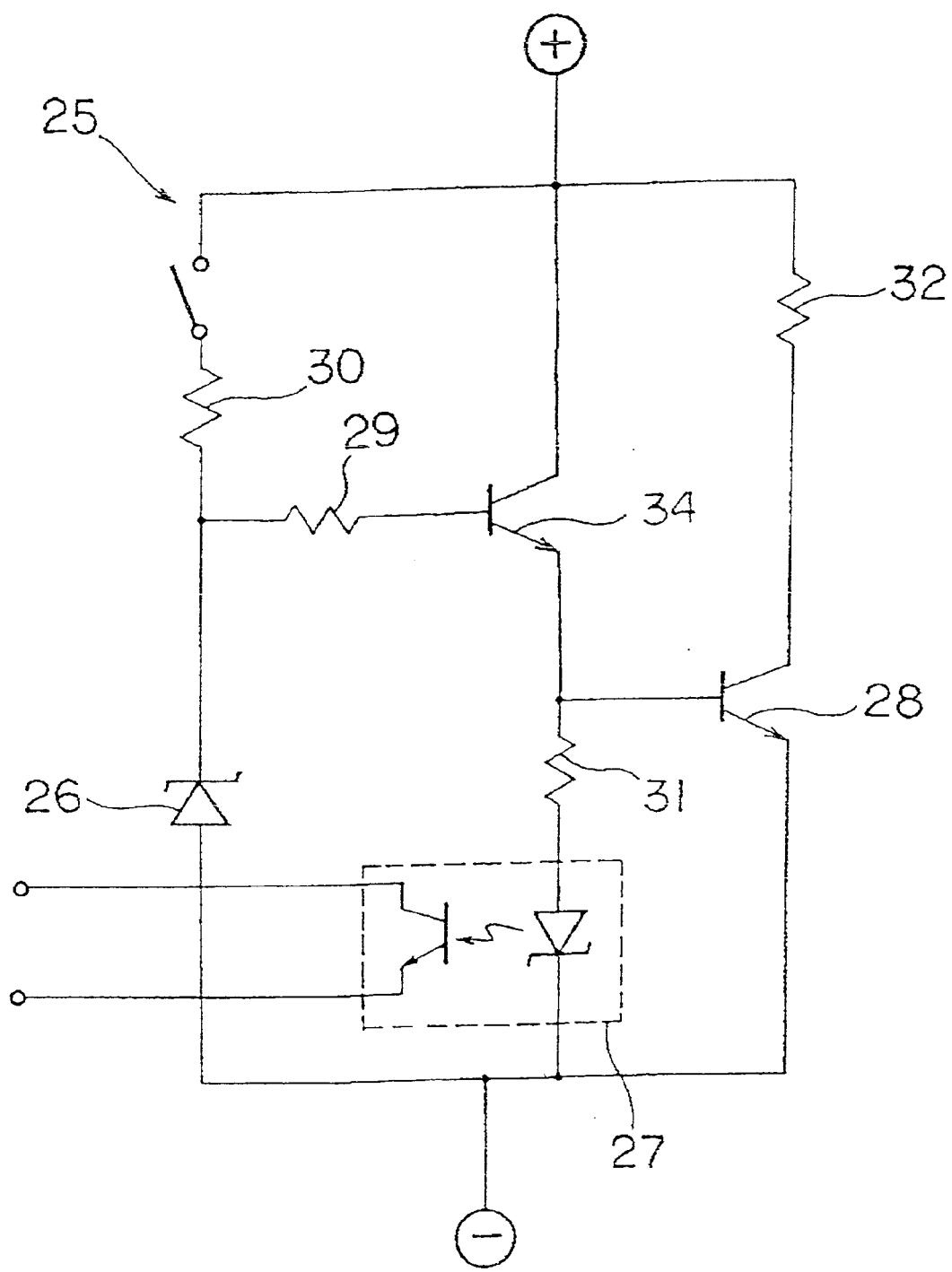
FIG. 4 is a circuit diagram of the parallel monitor circuit in the electric power storage device for the power supply system.

Referring to FIG. 4, the individual discharging circuit 25 comprises a voltage regulation diode 26, transistors 28 and 34 for discharging, resistances 29 through 32 and a photo-coupler 27. The voltage regulation diode (programmable shunt regulator) 26 is energized when the terminal voltage of the capacitor parallel circuit 23 rises beyond a predetermined value commanded by the capacitor management system 37. In this case, electric charge in the capacitor parallel circuit 23 is discharged through the resistance 32 and the transistor 28 for discharging. Further, in this discharging, a signal is outputted to the capacitor management system 37 through the photo-coupler 27. The photo-coupler 27 is equivalent to the discharging state detecting means of this invention.

The capacitor management system 37 determines whether either of the first capacitor bank 12 or the second capacitor bank 13 is in an operating state in which it can be halted. And, the capacitor management system 37 halts either one with the greater variations in terminal voltage among the respective capacitor parallel circuits 23 of the first capacitor bank 12 or the second capacitor bank 13, through the current pump 10 and the contactor 16. Further, the capacitor management system 37 performs control to equalize the terminal voltage by discharging electric charge in the capacitor parallel circuits 23 with higher terminal voltage.

Figure 5:
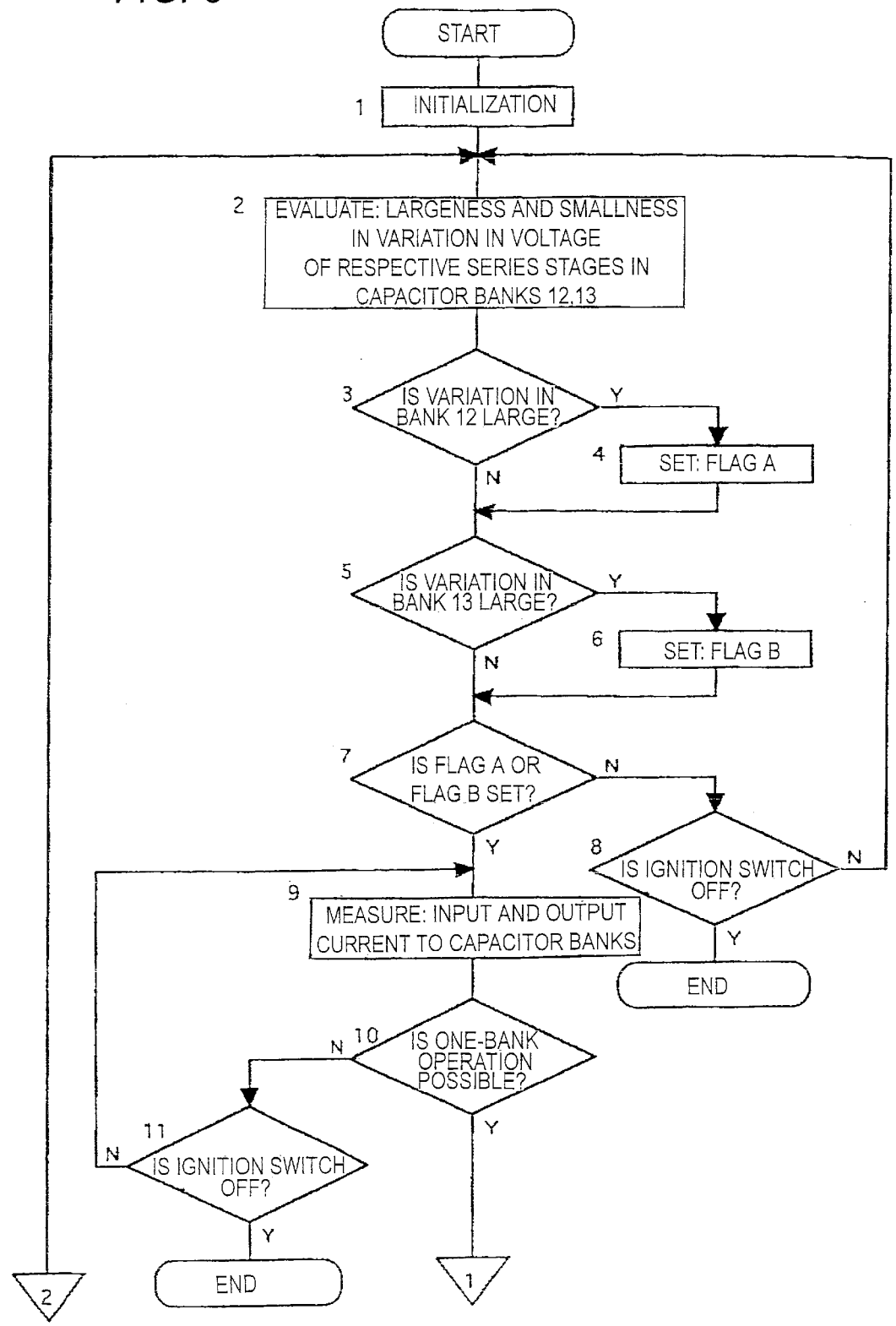
FIG. 5 is a flowchart showing a control executed in the electric power storage device for the power supply system.
Figure 6:
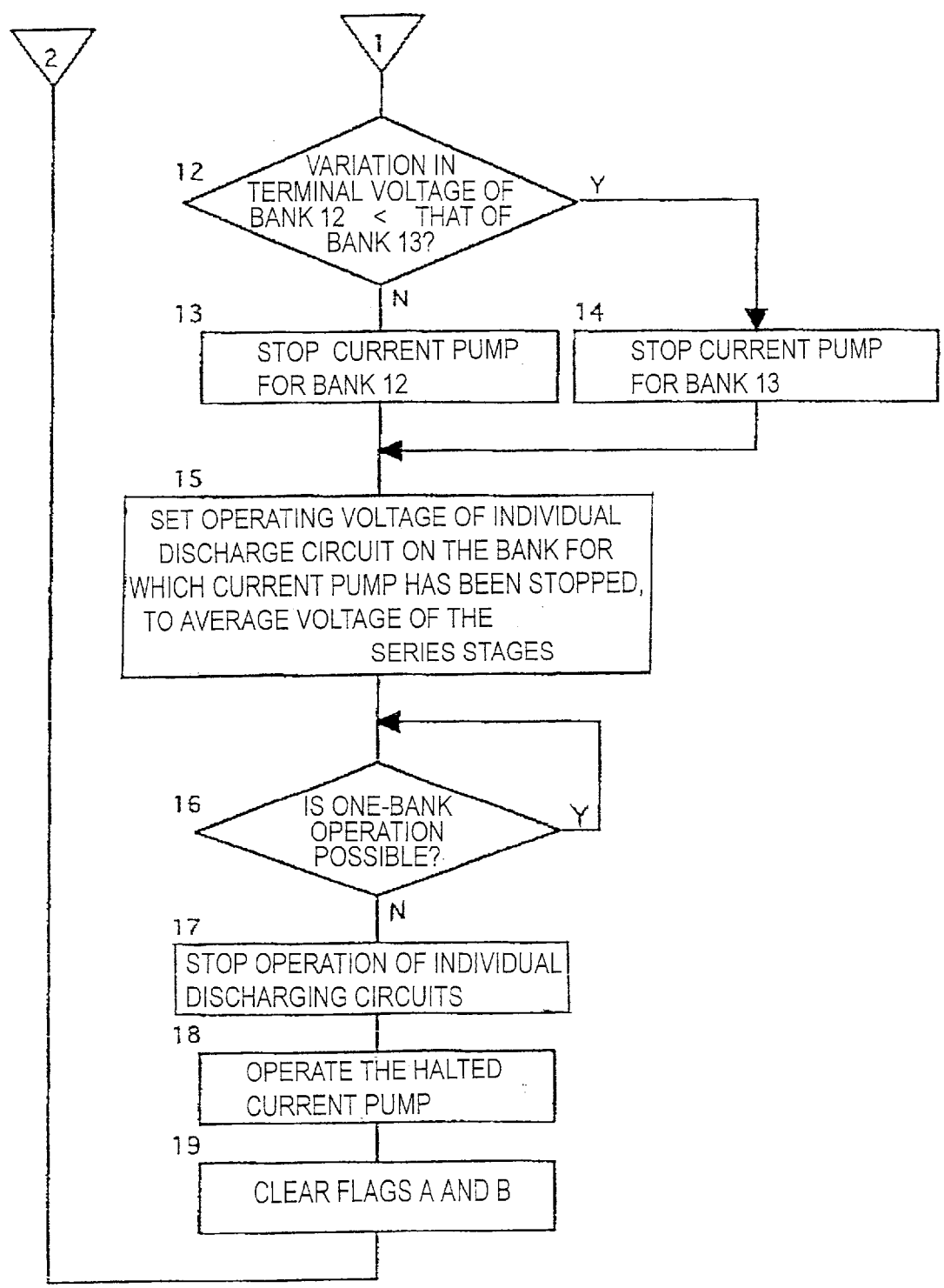
FIG. 6 is a flowchart showing the control executed in the electric power storage device for the power supply system.
Figure 7:
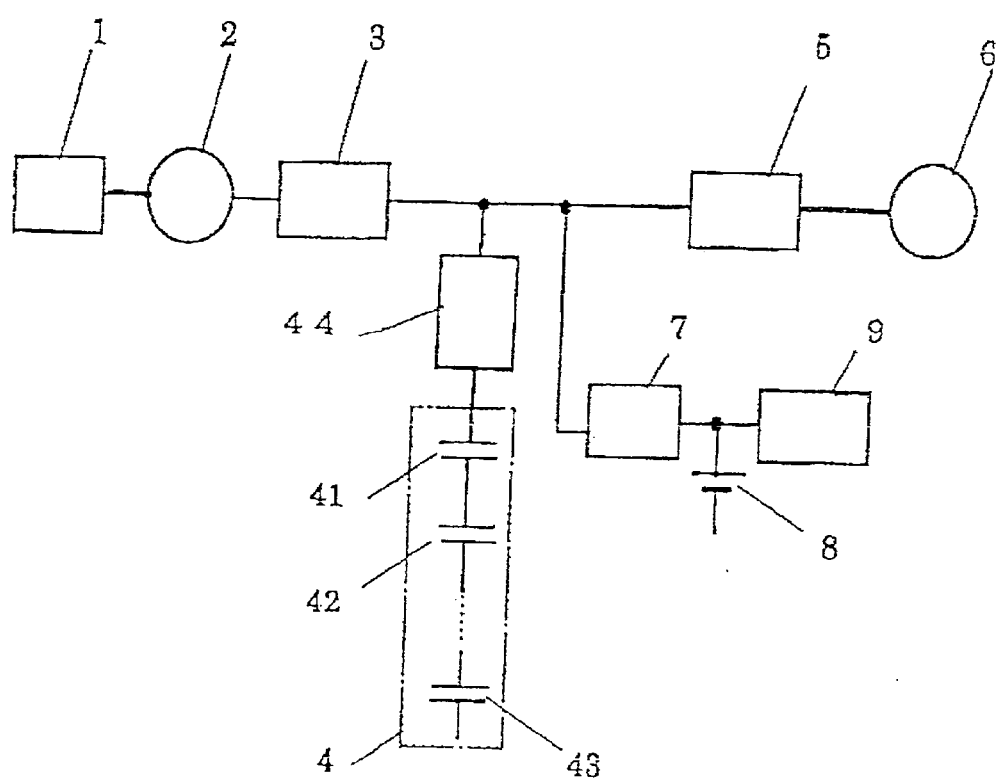
FIG. 7 is a configuration diagram of a power supply system for the conventional electric vehicle.

Flowcharts in FIG. 5 and FIG. 6 show control routines concerning the above-mentioned control, and this control routine is periodically executed by the capacitor management system 37. In a step 1, each flag described later is initialized. In a step 2, the degrees of variations in the terminal voltage of the capacitor 21 on respective series stages in the first capacitor bank 12 and the second capacitor bank 13, are evaluated. And then, if the variation in the first capacitor bank 12 is greater than a predetermined degree, a flag A is set, and if the variation in the second capacitor bank 13 is greater than the predetermined degree, a flag B is set (these correspond to processing in relation to Steps 3 through 6).

If flag A or flag B is set, the input and output current to the first capacitor bank 12 and the second capacitor bank 13 are measured, and if these input and output currents are below a predetermined current, it is determined that the electric power storage device is in an operating state in which the first capacitor bank 12 or the second capacitor bank 13 can be halted (these correspond to processing in Steps 7, 9 and 10).

If the electric power storage device is an operating state in which the first capacitor bank 12 or the second capacitor bank 13 can be halted, the current pump 10 for the capacitor bank which has a greater variation in the terminal voltage than the other capacitor is stopped, and sequentially electric charge in the respective capacitor parallel circuits 23 is individually discharged through the individual discharge circuit 25, and then the terminal voltage is brought near the measured average value (these correspond to processing in Steps 12 through 15).

If the electric power storage device is out of the operating state in which either one of the first capacitor bank 12 or the second capacitor bank 13 can be halted, operation of the individual discharging circuits 25 are stopped, operation of the current pump 10 is re-started, and then the flags A and B are cleared (these correspond to processing in Steps 16 through 19).

On the other hand, if both the flag A and B are not set, or neither the first capacitor bank 12 nor the second capacitor bank 13 can be halted, instead of the above processing the main routine ends as the ignition switch is turned OFF (these correspond to processing in Steps 7, 8, 10 and 11).

In addition, processing in Steps 9 through 14 is equivalent to the bank halting means of this invention, and processing in Step 15 is equivalent to the discharging control means of this invention.

Thus, even if there is variation in electrostatic capacity of the respective capacitors 21, storage electric power can be secured at a maximum by reducing variation in electric potential between the respective capacitors 21. Since the electric power storage device 4 comprises the 2×m×n pieces of capacitors 21, the maximum value Emax of electrostatic energy stored in the electric power storage device 4 is expressed by the following equation, where electrostatic capacity of the respective capacitors 21 is C, the withstand voltage is Vmax.

$$Emax = 2 \times m \times n \times C \times Vmax^2 / 2$$

Further, even if the electric power storage device 4 repeats charging and discharging, reduction of variation in electric potential between respective capacitors 21 prevents a part of the respective capacitors 21 from being overcharged, over-discharged or inversely charged, thereby realizing a long-life power supply system.

The above embodiment is predicated on a series type hybrid electric vehicle, however, this invention is also applicable to a power supply system for a parallel type hybrid electric vehicle, an electric vehicle on which a generator is not mounted, an electric vehicle of which power is a fuel cell, and other electric vehicles.

What is claimed is:

1. A power supply system for driving a vehicle, comprising:

an electric power storage device including a parallel connection of a plurality of capacitor banks, each of the capacitor banks having a plurality of capacitors connected in series, a bank halting means for halting at least one of the plurality of capacitor banks depending on current flowing through the electric power storage device, individual discharging circuits each individually discharging electric charge in the respective capacitors, a discharging control means for equalizing terminal voltage of the respective capacitors by discharging electric charge in the respective capacitors in the halted capacitor bank.

2. The power supply system for driving a vehicle according to claim 1, wherein each of the capacitor banks comprises a capacitor series circuit being connected to a power supply circuit in parallel, and having the plurality of capacitors connected in series, and capacitor parallel circuits in which the capacitors arranged in the same series stage of the respective capacitor series circuit are connected in parallel, and wherein the individual discharging circuits are constituted so as to individually discharge electric charge of the respective capacitor parallel circuits and equalize the respective terminal voltage.

3. The power supply system for driving a vehicle according to claim 2, further comprising an individual voltage detecting circuit for detecting the terminal voltage of the respective capacitor parallel circuits, wherein the bank halting means is constituted so as to halt the capacitor bank of which variation in the detected terminal voltage of the capacitor parallel circuits is large.

4. The power supply system for driving a vehicle according to claim 3, comprising the individual voltage detecting circuit for detecting the terminal voltage of the respective capacitor parallel circuits, wherein the discharging control means is constituted so as to allow the respective capacitors to discharge to the average value of the terminal voltages of the respective capacitor parallel circuits.

5. The power supply system for driving a vehicle according to claim 1, further comprising a discharging state detecting means for detecting a discharging state of the capacitor discharged by the individual discharging circuit.

6. The power supply system for driving a vehicle according to claim 2, further comprising a discharging state detecting means for detecting a discharging state of the capacitor discharged by the individual discharging circuit.

7. The power supply system for driving a vehicle according to claim 3, further comprising a discharging state detecting means for detecting a discharging state of the capacitor discharged by the individual discharging circuit.

8. The power supply system for driving a vehicle according to claim 4, further comprising a discharging state detecting means for detecting a discharging state of the capacitor discharged by the individual discharging circuit.

* * * * *